US010107257B2

United States Patent
Yarbrough et al.

(10) Patent No.: US 10,107,257 B2
(45) Date of Patent: Oct. 23, 2018

(54) WIND TURBINE ROTOR BLADE COMPONENTS FORMED FROM PULTRUDED HYBRID-RESIN FIBER-REINFORCED COMPOSITES

(71) Applicant: General Electric Company, Schenectady, NY (US)

(72) Inventors: Aaron A. Yarbrough, Greenville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 14/862,210

(22) Filed: Sep. 23, 2015

(65) Prior Publication Data
US 2017/0082089 A1    Mar. 23, 2017

(51) Int. Cl.
*F03D 1/06* (2006.01)
*B29C 70/52* (2006.01)
(Continued)

(52) U.S. Cl.
CPC ............ *F03D 1/0675* (2013.01); *B29C 70/52* (2013.01); *B29C 70/521* (2013.01);
(Continued)

(58) Field of Classification Search
CPC ....... F03D 1/0675; F03D 13/10; B29C 70/52; B29C 70/528; B29C 70/523; B29C 70/521; B29C 70/86; B29C 70/865; B29C 70/46; B29C 70/525; B29D 99/0028; B29D 99/0003; B29K 2101/10; B29K 2101/12;
(Continued)

(56) References Cited

U.S. PATENT DOCUMENTS 3,520,750 A * 7/1970 Prevorsek ............. B29C 43/305
                                                    156/199
4,938,823 A * 7/1990 Balazek ................ B29C 47/003
                                                    156/166
(Continued)

FOREIGN PATENT DOCUMENTS

AU    2003229497 A1    10/2003
CA       2526407 C     12/2004
(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

*Primary Examiner* — Kenneth Bomberg
*Assistant Examiner* — Eldon Brockman
(74) *Attorney, Agent, or Firm* — Dority & Manning, P.A.

(57) ABSTRACT

A rotor blade component for a wind turbine rotor blade may generally include an assembly of pre-formed pultruded products. Each pultruded product may include an interior pultruded portion formed from a first fiber-reinforced composite including a first plurality of fibers surrounded by a thermoset resin material and an exterior pultruded portion encapsulating the interior pultruded portion. The exterior pultruded portion may be formed from a second fiber-reinforced composite including a second plurality of fibers surrounded by a thermoplastic resin material.

21 Claims, 5 Drawing Sheets

(51) Int. Cl.
  *B29D 99/00* (2010.01)
  *F03D 13/10* (2016.01)
  *B29L 31/08* (2006.01)
  *B29K 101/10* (2006.01)
  *B29K 101/12* (2006.01)

(52) U.S. Cl.
  CPC .......... *B29C 70/523* (2013.01); *B29C 70/528* (2013.01); *B29D 99/0028* (2013.01); *F03D 13/10* (2016.05); *B29K 2101/10* (2013.01); *B29K 2101/12* (2013.01); *B29L 2031/085* (2013.01); *Y02E 10/721* (2013.01)

(58) Field of Classification Search
  CPC ............ B29K 2105/04; B29K 2033/26; Y02E 10/721; B29L 2031/085
  See application file for complete search history.

(56) References Cited

U.S. PATENT DOCUMENTS

| | | | |
|---|---|---|---|
| 5,585,155 A * | 12/1996 | Heikkila | B29C 70/08 428/34.1 |
| 5,667,881 A * | 9/1997 | Rasmussen | B29C 66/1122 156/308.2 |
| 6,106,944 A * | 8/2000 | Heikkila | B29C 70/08 428/105 |
| 6,197,412 B1 * | 3/2001 | Jambois | B29C 47/28 428/297.4 |
| 6,264,877 B1 | 7/2001 | Pallu De La Barriere | |
| 7,625,185 B2 | 12/2009 | Wobben | |
| 8,079,818 B2 | 12/2011 | Burchardt et al. | |
| 8,142,162 B2 | 3/2012 | Godsk et al. | |
| 8,168,027 B2 | 5/2012 | Jacobsen et al. | |
| 8,172,538 B2 | 5/2012 | Hancock et al. | |
| 8,297,932 B2 | 10/2012 | Arocena De La Rua et al. | |
| 8,317,479 B2 | 11/2012 | Vronsky et al. | |
| 8,353,674 B2 | 1/2013 | Bech | |
| 8,506,258 B2 | 8/2013 | Baker et al. | |
| 8,511,996 B2 | 8/2013 | Gonzalez et al. | |
| 8,540,491 B2 | 9/2013 | Gruhn et al. | |
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,764,401 B2 | 7/2014 | Hayden et al. | |
| 8,826,534 B2 | 9/2014 | Cappelli et al. | |
| 8,961,142 B2 | 2/2015 | Wansink | |
| 8,992,813 B2 | 3/2015 | Robbins et al. | |
| 9,073,270 B2 | 7/2015 | Bech | |
| 2009/0148300 A1 | 6/2009 | Driver et al. | |
| 2011/0045276 A1 | 2/2011 | Grove-Nielsen | |
| 2011/0135485 A1 * | 6/2011 | Wang | F03D 1/0675 416/226 |
| 2011/0318186 A1 | 12/2011 | Kristensen et al. | |
| 2012/0034833 A1 * | 2/2012 | Schaube | A63C 11/227 442/172 |
| 2012/0180582 A1 | 7/2012 | Piasecki | |
| 2012/0230830 A1 | 9/2012 | Lind et al. | |
| 2012/0237356 A1 | 9/2012 | Mironov | |
| 2013/0108453 A1 | 5/2013 | Baker et al. | |
| 2013/0149166 A1 | 6/2013 | Schibsbye | |
| 2013/0164133 A1 | 6/2013 | Grove-Nielsen | |
| 2013/0333823 A1 | 12/2013 | Hedges et al. | |
| 2014/0003956 A1 | 1/2014 | Lull et al. | |
| 2014/0023513 A1 | 1/2014 | Johnson et al. | |
| 2014/0030094 A1 | 1/2014 | Dahl et al. | |
| 2014/0119936 A1 | 5/2014 | Dahl et al. | |
| 2015/0129118 A1 * | 5/2015 | Hickman | B32B 37/1027 156/199 |
| 2016/0146184 A1 * | 5/2016 | Caruso | F03D 1/0675 416/230 |
| 2016/0263844 A1 * | 9/2016 | Smith | B29C 70/525 |
| 2017/0057158 A1 * | 3/2017 | Caruso | B29D 99/0028 |
| 2017/0058864 A1 * | 3/2017 | Tobin | F03D 1/0675 |
| 2017/0058865 A1 * | 3/2017 | Caruso | F03D 1/0675 |

FOREIGN PATENT DOCUMENTS

| | | |
|---|---|---|
| CN | 201155423 Y | 11/2008 |
| CN | 100476200 C | 4/2009 |
| CN | 101725481 A | 6/2010 |
| CN | 101302302 B | 2/2011 |
| CN | 101194102 B | 4/2012 |
| CN | 102459881 A | 5/2012 |
| CN | 101906251 B | 6/2013 |
| CN | 102705157 A | 10/2013 |
| DE | 102011051172 A1 | 12/2012 |
| DE | 102012219224 B3 | 3/2014 |
| DK | 201270816 A | 1/2014 |
| DK | 201270818 A | 1/2014 |
| EP | 2113373 B1 | 1/2011 |
| EP | 2255957 B1 | 7/2013 |
| EP | 2679804 A1 | 1/2014 |
| EP | 2679806 A1 | 1/2014 |
| EP | 2682256 A1 | 1/2014 |
| GB | 2451192 A | 1/2009 |
| GB | 2455044 A | 6/2009 |
| IN | 201006838 P1 | 10/2009 |
| JP | 3930200 B2 | 6/2007 |
| JP | 2011032987 A | 2/2011 |
| JP | 2011038518 | 2/2011 |
| JP | 54394112 B2 | 3/2014 |
| KR | 101299064 | 8/2013 |
| WO | WO 2007092716 A | 4/2007 |
| WO | WO2012/025830 A2 | 3/2010 |
| WO | WO2010/057502 A3 | 5/2010 |
| WO | WO2011/088835 A2 | 7/2011 |
| WO | WO2011/098785 A2 | 8/2011 |
| WO | WO2012/042261 A1 | 4/2012 |
| WO | WO2012/140039 A2 | 10/2012 |
| WO | WO2013/007351 A1 | 1/2013 |
| WO | WO2013/060582 A1 | 5/2013 |
| WO | WO2013/178228 A1 | 12/2013 |
| WO | WO2014/044280 A1 | 3/2014 |
| WO | WO2014/063944 A1 | 5/2014 |
| WO | WO2015/015202 A1 | 2/2015 |

* cited by examiner

WIND TURBINE ROTOR BLADE COMPONENTS FORMED FROM PULTRUDED HYBRID-RESIN FIBER-REINFORCED COMPOSITES

FIELD OF THE INVENTION

The present subject matter relates generally to wind turbine rotor blades and, more particularly, to rotor blade components formed from pultruded, hybrid-resin fiber-reinforced composites and methods of forming such composites.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades typically include an outer body skin or shell formed from a composite laminate material. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell. The spar caps are typically constructed from laminate composites (e.g., glass fiber laminate composites and/or carbon fiber laminate composites) that include dry or non-cured fabric plies that are laid up within the blade mold and subsequently infused with resin. Such materials, however, can be difficult to control during the manufacturing process and/or are often defect prone and/or highly labor intensive due to handling of the non-cured fabrics and the challenges of infusing large laminated structures.

As such, recent attempts have been made to form spar caps from pre-fabricated, pre-cured composites that can be produced in thicker sections, and are typically less susceptible to defects. However, the use of these thicker, pre-cured composites also presents unique challenges during the blade manufacturing process. For example, such composites often present challenges with respect to coupling or bonding adjacent composite structures together to form the spar cap.

Accordingly, a pultruded, fiber-reinforced composite including a hybrid-resin configuration that allows for adjacent composite structures to be easily and efficiently secured to one another would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a blade root, a blade tip and a body shell extending between the blade root and the blade tip. The rotor blade may also include a spar cap configured to provide structural support for the body shell, with the spar cap being formed from an assembly of pre-formed pultruded products. Each pultruded product may include an interior pultruded portion formed from a first fiber-reinforced composite including a first plurality of fibers surrounded by a thermoset resin material and an exterior pultruded portion encapsulating the interior pultruded portion. The exterior pultruded portion may be formed from a second fiber-reinforced composite including a second plurality of fibers surrounded by a thermoplastic resin material.

In another aspect, the present subject matter is directed to a rotor blade component for a wind turbine rotor blade. The rotor blade component may generally include an assembly of pre-formed pultruded products. Each pultruded product may include an interior pultruded portion formed from a first fiber-reinforced composite including a first plurality of fibers surrounded by a thermoset resin material and an exterior pultruded portion encapsulating the interior pultruded portion. The exterior pultruded portion may be formed from a second fiber-reinforced composite including a second plurality of fibers surrounded by a thermoplastic resin material. In addition, the thermoplastic resin material contained within the exterior pultruded portion of each pultruded product may be welded to the thermoplastic resin material contained within the exterior pultruded portion of an adjacent pultruded product to secure the adjacent pultruded products together.

In a further aspect, the present subject matter is directed to a method for forming a pultruded, hybrid-resin fiber-reinforced composite for use within a rotor blade component of a wind turbine rotor blade. The method may generally include transporting a pre-formed fiber-reinforced composite along a travel path, wherein the pre-formed fiber-reinforced composite includes a first plurality of fibers surrounded by a thermoset resin material. The method may also include transporting a second plurality of fibers along the travel path, wherein the second plurality of fibers are impregnated with a thermoplastic resin material. In addition, the method may include directing the pre-formed fiber-reinforced composite and the second plurality of fibers through a heated die such that a pultruded product is formed that includes an interior pultruded portion formed from the pre-formed fiber-reinforced composite and an exterior pultruded portion that encapsulates the interior pultruded portion, wherein the exterior pultruded portion is formed from a second fiber-reinforced composite including the second plurality of fibers surrounded by the thermoplastic resin material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
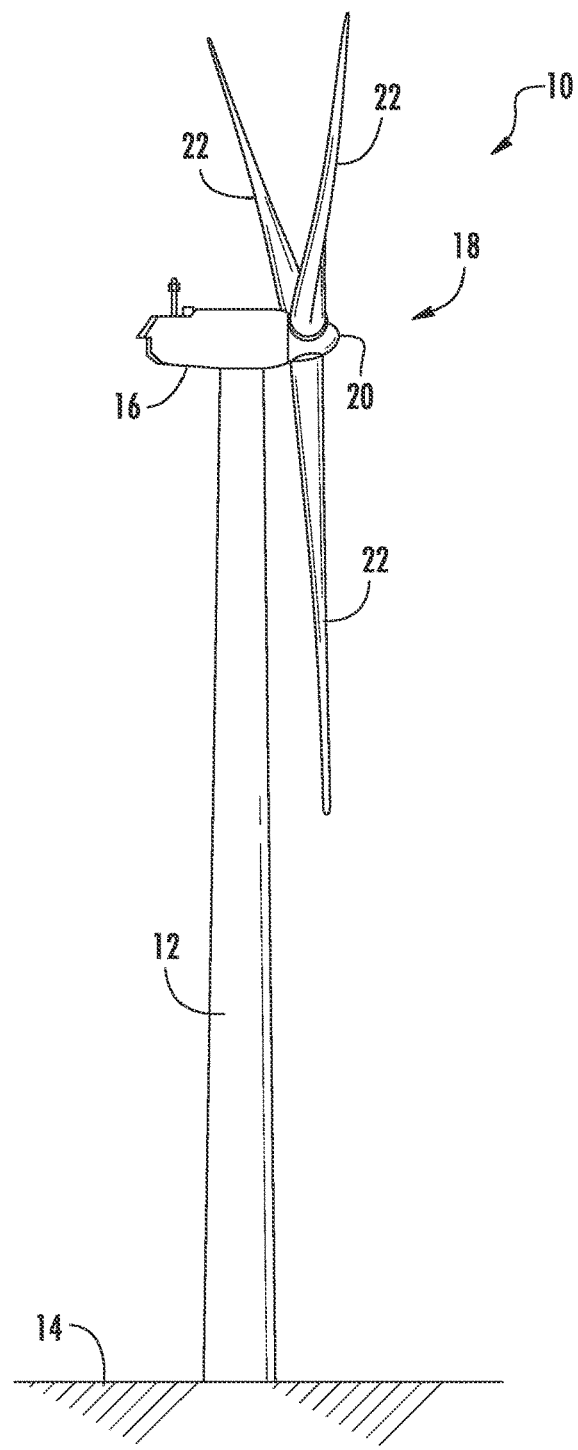
FIG. 1 illustrates a side view of one embodiment of a wind turbine in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to wind turbine rotor blade components formed from pultruded, hybrid-resin fiber-reinforced composites and methods of forming such composites. Specifically, in several embodiments, a rotor blade component (e.g., a spar cap or any other suitable blade component) may be formed from an assembly of pultruded plates, with each pultruded plate including an interior pultruded portion and an exterior pultruded portion that encapsulates the interior pultruded portion. In such embodiments, the interior pultruded portion may be formed from a thermoset-based fiber-reinforced composite (e.g., a fiber-reinforced composite including a plurality of fibers surrounded by a thermoset resin material) while the exterior pultruded portion may be formed from a thermoplastic-based fiber-reinforced composite (e.g., a fiber-reinforced composite including a plurality of fibers surrounded by a thermoplastic resin material). As a result, the thermoplastic resin material forming the exterior pultruded portion of each pultruded plate may allow adjacent pultruded plates to be welded together via thermoplastic welding. Thus, for example, to manufacture a spar cap for a wind turbine rotor blade, a plurality of the disclosed pultruded plates may be stacked one on top of the other, with adjacent plates being welded together to form the resulting spar cap.

It should be appreciated that the hybrid-resin fiber-reinforced plates described herein may provide numerous advantages in addition to allowing adjacent plates to be welded together via thermoplastic welding. For example, given that the exterior pultruded portion of each plate is formed from a fiber-reinforced composite (as opposed to a thermoplastic coating or film), the fibers contained within the exterior pultruded portion may provide additional shear strength and stiffness to each pultruded plate. Moreover, in many instances, the thermoset resin material used to form the interior pultruded portion of each pultruded plate may be less expensive than the thermoplastic resin material used to form the exterior pultruded portion of each pultruded plate. In such instances, a significant cost savings may be achieved by forming a majority of the volume of each pultruded plate from the thermoset-based interior pultruded portion, with the exterior pultruded portion being positioned around the outer perimeter of the interior pultruded portion to allow the plate to be welded to adjacent plates. Further, in addition to cost savings, forming the majority of the volume of each pultruded plate from the thermoset-based interior pultruded portion may also mitigate any creep issues associated with the use of the thermoplastic resin material.

As will be described below, in several embodiments, the disclosed hybrid-resin fiber-reinforced plates may be formed from a pultrusion process in which a pre-formed, thermoset-based fiber-reinforced composite is directed through a heated pultrusion die along with fibers impregnated with a thermoplastic resin material. The resulting pultruded product may include an interior pultruded portion formed from the pre-formed, thermoset-based fiber-reinforced composite and an exterior pultruded portion formed from a thermoplastic-based fiber-reinforced composite.

It should be appreciated that, as described herein, thermoplastic materials generally encompass a plastic material (s) or polymer(s) that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, as described herein, thermoset materials generally encompass a plastic material(s) or polymer(s) that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
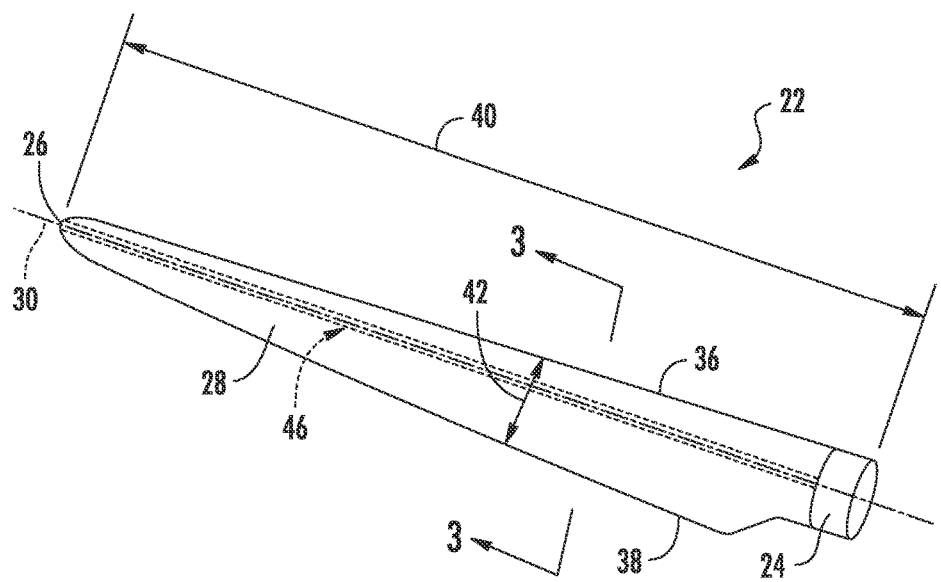
FIG. 2 illustrates a perspective view of one embodiment of a rotor blade suitable for use within the wind turbine shown in FIG. 1 in accordance with aspects of the present subject matter.
Figure 3:
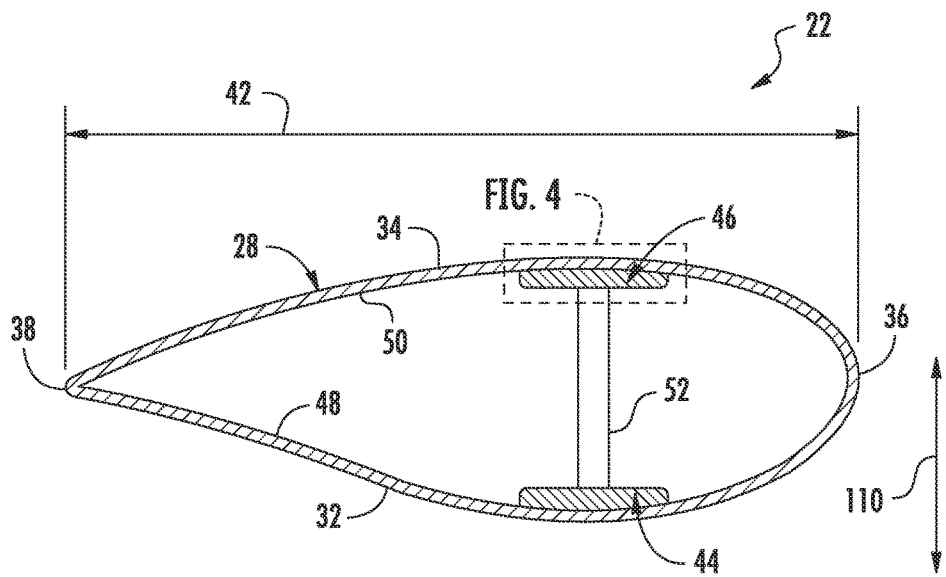
FIG. 3 illustrates a cross-sectional view of the rotor blade shown in FIG. 2 taken about line 3-3.

Referring now to FIGS. 2 and 3, one embodiment of a rotor blade 22 suitable for use within the wind turbine 10 shown in FIG. 1 is illustrated in accordance with aspects of the present subject matter. Specifically, FIG. 2 illustrates a perspective view of the rotor blade 22. Additionally, FIG. 3 illustrates a cross-sectional view of the rotor blade 22 taken about line 3-3 shown in FIG. 2.

As shown, the rotor blade 22 generally includes a blade root 24 configured to be mounted or otherwise secured to the hub 20 (FIG. 1) of the wind turbine 10 and a blade tip 26 disposed opposite the blade root 24. Additionally, the rotor blade 22 may include a body shell 28 configured to extend between the blade root 24 and the blade tip 26 along a longitudinal axis 30 of the blade 22. The body shell 28 may generally serve as the outer casing/covering of the rotor blade 22 and may define a substantially aerodynamic profile, such as by defining a symmetrical or cambered airfoil-shaped cross-section. For example, as shown in FIG. 3, the body shell 28 may define a pressure side 32 and a suction side 34 extending between leading and trailing ends 36, 38 of the rotor blade 22. Further, the rotor blade 22 may also have a span 40 defining the total length between the blade root 24 and the blade tip 26 and a chord 42 defining the total length between the leading edge 36 and the trialing edge 38. As is generally understood, the chord 42 may generally vary in length with respect to the span 40 as the rotor blade 22 extends from the blade root 24 to the blade tip 26.

In several embodiments, the body shell 28 of the rotor blade 22 may be formed from a plurality of shell components or sections. For example, in one embodiment the body shell 28 may be manufactured from a first shell half or section generally defining the pressure side 32 of the rotor blade 22 and a second shell half or section generally defining the suction side 34 of the rotor blade 22, with such shell sections being secured to one another at the leading and trailing edges 36, 38 of the blade 22. Alternatively, the body shell 28 may be formed from any other suitable number and/or arrangement of shell sections. For instance, in one embodiment, the body shell 28 may be segmented along the longitudinal axis 30 of the rotor blade 22, with each spanwise segment being formed from one or more shell sections.

Additionally, the body shell 28 may generally be formed from any suitable material. For instance, in one embodiment, the body shell 28 may be formed entirely from a laminate composite material, such as a carbon fiber reinforced laminate composite or a glass fiber reinforced laminate composite. Alternatively, one or more portions of the body shell 28 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 22 may also include one or more longitudinally extending structural components configured to provide increased stiffness, buckling resistance and/or strength to the blade 22. For example, the rotor blade 22 may include a pair of longitudinally extending spar caps 44, 46 configured to be engaged against opposing inner surfaces 48, 50 of the pressure and suction sides 32, 34 of the rotor blade 22, respectively. Additionally, one or more shear webs 52 may be disposed between the spar caps 44, 46 so as to form a beam-like configuration. The spar caps 44, 46 may generally be designed to control the bending stresses and/or other loads acting on the rotor blade 22 in a generally spanwise direction (a direction parallel to the span 40 of the rotor blade 22) during operation of a wind turbine 10. Similarly, the spar caps 44, 46 may also be designed to withstand the spanwise compression occurring during operation of the wind turbine 10.

Figure 4:
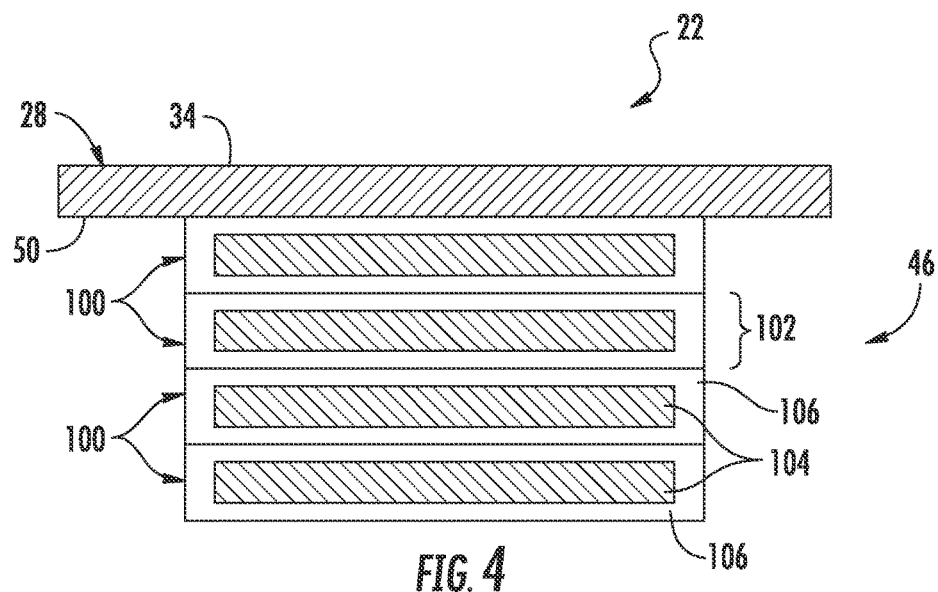
FIG. 4 illustrates a close-up view of a portion of the rotor blade shown in FIG. 3, particularly illustrating a spar cap of the rotor blade formed from an assembly of pultruded plates.

Referring now to FIG. 4, a close-up, cross-sectional view of one of the spar caps 46 shown in FIG. 3 is illustrated in accordance with aspects of the present subject matter, particularly illustrating the spar cap 46 being constructed or formed from a plurality of pultruded plates 100. In addition, FIG. 5 illustrates a more detailed, cross-sectional view of one of the pultruded plates 100 shown in FIG. 4.

As shown in FIG. 4, in several embodiments, the spar cap 46 may be formed from an assembly of pre-formed, pultruded plates 100. In such embodiments, each pultruded plate 100 may be initially manufactured as an individual component (e.g., using the method/system described below with reference to FIG. 7). The various pre-formed plates 100 may then be assembled or joined together to form the resulting spar cap 46. For example, as shown in the illustrated embodiment of FIG. 4, each of the pre-cured laminate plates 100 may form a single layer 102 of the spar cap 46. In such an embodiment, the layers 102 may be stacked one on top of the other and joined together such that each pultruded plate 100 is coupled or secured to the plate(s) 100 located immediately adjacent thereto. For instance, as will be described below, the adjacent pultruded plates 100 may, in several embodiments, be welded together via thermoplastic welding to form the resulting spar cap 46. Alternatively, the pultruded plates 100 may be coupled to one another using any other suitable attachment means, such by using adhesives, a lay-up process and/or any other suitable means.

Figure 5:
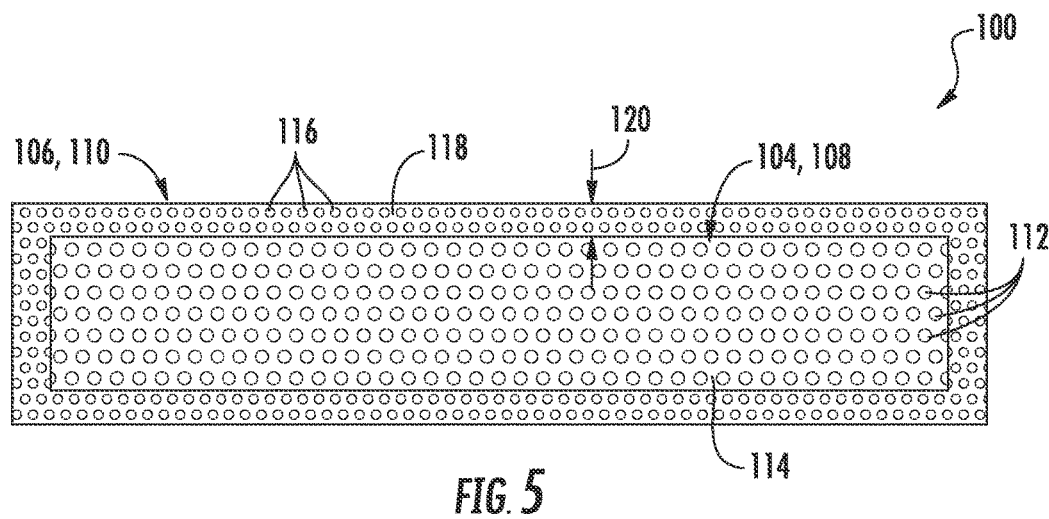
FIG. 5 illustrates a more detailed, cross-sectional view of one of the pultruded plates shown in FIG. 4, particularly illustrating the plate including a thermoset-based interior pultruded portion and a thermoplastic-based exterior pultruded portion that encapsulates the interior pultruded portion.

As particularly shown in FIG. 5, each pultruded plate 100 may include both an interior pultruded portion 104 and an exterior pultruded portion 106, with the exterior pultruded portion 106 encapsulating the interior pultruded portion 104 such that the interior pultruded portion 104 is completely surrounded by the exterior pultruded portion 106. In several embodiments, the interior pultruded portion 104 may be formed from a thermoset-based, first fiber-reinforced composite 108 while the exterior pultruded portion 106 may be formed from a thermoplastic-based, second fiber-reinforced composite 110. Specifically, as shown in FIG. 5, the first fiber-reinforced composite 108 may include a first plurality of fibers 112 (e.g., carbon and/or glass fibers) surrounded by a thermoset resin material 114. Similarly, the second fiber-reinforced composite 110 may include a second plurality of fibers 116 (e.g., carbon and/or glass fibers) surrounded by a thermoplastic resin material 118.

In several embodiments, the majority of each pultruded plate 100 may be formed from its thermoset-based interior pultruded portion 104 as opposed to its thermoplastic-based exterior pultruded portion 106. For instance, in one embodiment, a total volume of each pultruded plate 100 may include greater than 50% of the first fiber-reinforced composite 108 and less than 50% of the second fiber-reinforced composite 110, such as by including greater than 75% of the first fiber-reinforced composite 108 and less than 25% of the second fiber-reinforced composite 110 or by including greater than 90% of the first fiber-reinforced composite 108 and less than 10% of the second fiber-reinforced composite 110 and/or any other subranges therebetween. Such an embodiment may be particularly advantageous when the thermoset resin material 114 used to form the first fiber-reinforced composite 108 is less expensive than the thermoplastic resin material 118 used to form the second fiber-reinforced composite 110.

Given that the interior pultruded potion 104 of each pultruded plate 100 is configured to be fully encapsulated by the corresponding exterior pultruded portion 106, it should be appreciated that the second fiber-reinforced composite 110 forming the exterior pultruded portion 106 may generally be configured to define a given thickness 120 around the entire outer perimeter of the interior pultruded portion 104. Such thickness 120 may vary or remain constant along the outer perimeter of the interior pultruded portion 104. For instance, in one embodiment, the thickness 120 of the second fiber-reinforced composite 110 may be equal to at least 1 millimeter (mm) around the entire outer perimeter of the interior pultruded portion 104, such as a thickness of at least 2 mm around the entire outer perimeter of the interior pultruded portion 104 or at least 3 mm around the entire outer perimeter of the interior pultruded portion 104 or at least 5 mm around the entire outer perimeter of the interior pultruded portion 104 and/or any other subranges therebetween.

It should also be appreciated that pultruded plates 100 described herein may generally be configured to define any suitable cross-sectional shape. For instance, in the illustrated embodiment, each pultruded plate 100 defines a generally rectangular-shaped cross-section. However, in other embodiments, each pultruded plate 100 may define any other suitable cross-sectional shape.

Figure 6:
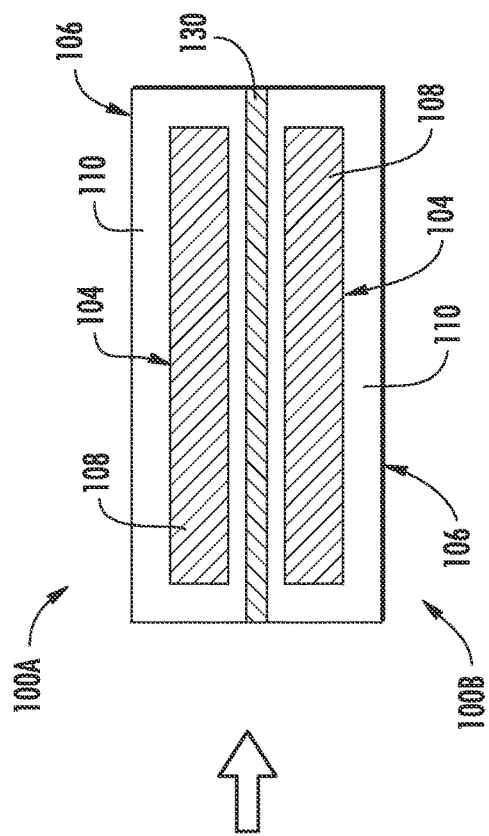
FIG. 6 illustrates an example cross-sectional view of two of the pultruded plates shown in FIG. 4, particularly illustrating the plates before and after being welded together via thermoplastic welding.
Figure 6:
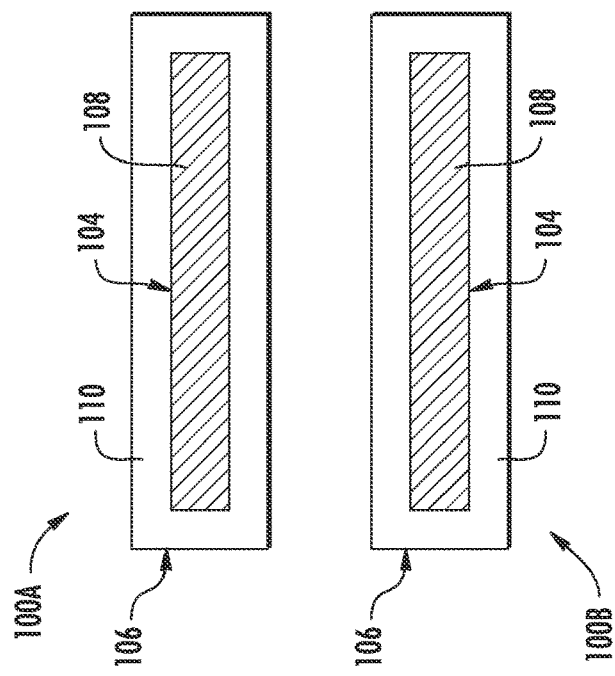

As indicated above, by forming the exterior pultruded portion 106 of each plate 100 from a thermoplastic-based fiber-reinforced composite 110, the thermoplastic resin material 118 contained within the exterior pultruded portions 106 of adjacent plates 100 may be welded together, thereby allowing the plates 100 to be securely attached to one another. For instance, FIG. 6 illustrates a simplified view of two pultruded plates 100A, 100B configured in accordance with aspects of the present subject matter, particularly illustrating the plates 100A, 100B before and after being welded together. As shown, when assembling or joining the plates 100A, 100B together, the thermoplastic resin material contained within the exterior pultruded portions 110 of the plates 100A, 100B may be welded together form a welded joint (indicated by the cross-hatched section 130 in FIG. 6) between the two plates 100A, 100B. For instance, the plates 100A, 100B may be initially stacked on one top of the other. Thereafter, a combination of heat and pressure may be applied to the plates 100A, 100B to both increase the temperature of the thermoplastic resin material (e.g., to its glass transition temperature) and press the plates 100A, 100B together. The resulting welded joint 130 may provide a strong, secure connection between the plates 100A, 100B.

It should be appreciated that, although the present subject matter has generally been described herein with reference to the use of the disclosed plates 100 in forming a spar cap for a wind turbine rotor blade, the plates 100 may also be utilized to form any other suitable section, component and/or feature of a rotor blade. For instance, in one embodiment, the plates 100 may be used to form a shear web for a rotor blade and/or to build-up the thickness of a blade root of a rotor blade.

Additionally, as indicated above, it should be appreciated that the present subject matter is also directed to a method for forming a pultruded, hybrid-resin fiber-reinforced composite for use within a blade component of a wind turbine rotor blade. In several embodiments, the method may include transporting a pre-formed fiber-reinforced composite along a travel path, wherein the pre-formed fiber-reinforced composite includes a first plurality of fibers surrounded by a thermoset resin material. The method may also include transporting a second plurality of fibers along the travel path, wherein the second plurality of fibers are impregnated with a thermoplastic resin material. In addition, the method may include directing the pre-formed fiber-reinforced composite and the second plurality of fibers through a heated die such that a pultruded product is formed that includes an interior pultruded portion formed from the pre-formed fiber-reinforced composite and an exterior pultruded portion that encapsulates the interior pultruded portion, wherein the exterior pultruded portion is formed from a second fiber-reinforced composite including the second plurality of fibers surrounded by the thermoplastic resin material.

Figure 7:
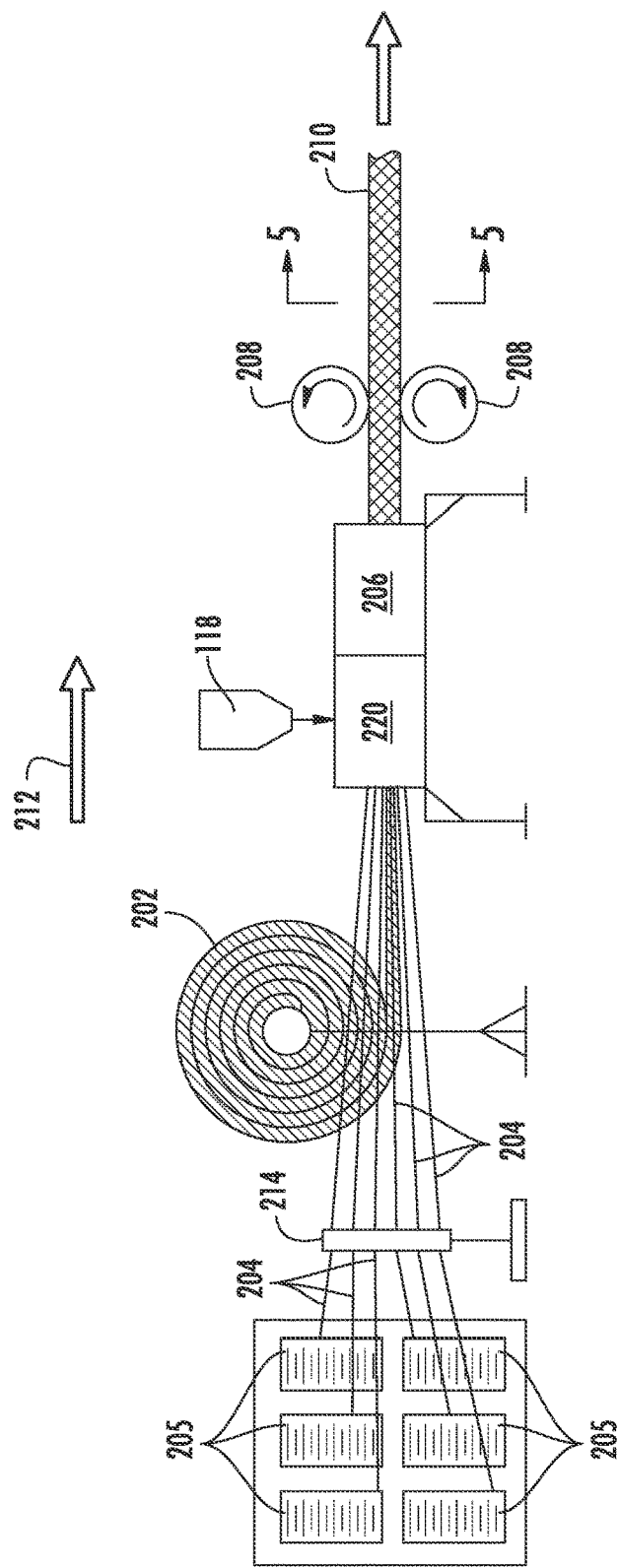
FIG. 7 illustrates a schematic view of one embodiment of a system for forming a pultruded, hybrid-resin fiber-reinforced composite for use within a wind turbine rotor blade component in accordance with aspects of the present subject matter.

One example of a system 200 for performing the method described above is illustrated in FIG. 7. In general, the system 200 may be configured to implement a pultrusion process in which both a pre-formed, thermoset-based fiber-reinforced composite 202 and a plurality of thermoplastic-impregnated fibers 204 are directed through a heated pultrusion die 206 (e.g., via one or more tension rollers 208) to produce a final pultruded product 210 corresponding to a hybrid-resin, fiber-reinforced composite plate. Specifically, as shown in FIG. 7, the system 200 may include a continuous roll of a preformed fiber-reinforced composite 202. In several embodiments, the preformed fiber-reinforced composite 202 may correspond to the first fiber-reinforced composite 108 described above with reference to FIG. 5 and, thus, may include a first plurality of fibers 112 surrounded by a thermoset resin material 114. In such embodiments, the thermoset resin material included within the preformed fiber-reinforced composite 202 may be pre-cured or may correspond to uncured thermoset resin. Additionally, the system 200 may include a plurality of rovings or continuous rolls 205 of dry fibers 204. In several embodiments, such dry fibers 204 may correspond to the second plurality of fibers 116 included within the second fiber-reinforced composite 110 described above with reference to FIG. 5.

As shown in FIG. 7, both the preformed fiber-reinforced composite 202 and the dry fibers 204 may be transported or pulled in a processing direction (indicated by arrow 212) along a travel path towards the pultrusion die 206. In several embodiments, the preformed fiber-reinforced composite 202 and the dry fibers 204 may be positioned relative to one another such that the dry fibers 204 surround the preformed fiber-reinforced composite 202 as the composite/fibers are directed along the travel path into the die 206. For instance, as shown in FIG. 7, a fiber guide 214 may be positioned downstream of the source of the dry fibers 204 to allow the fibers 204 to be properly positioned relative to the preformed fiber-reinforced composite 202. Such relative positioning of the preformed fiber-reinforced composite 202 and the dry fibers 204 may subsequently allow the dry fibers 204 to be incorporated into a thermoplastic-based fiber-reinforced composite (e.g., the second fiber-reinforced composite 110 described above with reference to FIG. 5) that encapsulates the preformed fiber-reinforced composite 202.

Additionally, as shown in FIG. 5, a resin impregnator 220 (e.g., a resin bath or a resin injector) may be positioned immediately upstream of the pultrusion die 206 along the travel path of the preformed fiber-reinforced composite 202 and the dry fibers 204. In such embodiments, the resin impregnator 220 may be configured to impregnate the dry fibers 204 with a thermoplastic resin material 118. The preformed fiber-reinforced composite 202 and impregnated fibers 204 may then be directed through the heated pultrusion die 206 to allow the thermoplastic resin material 118 to undergo polymerization and cure around the exterior of the preformed fiber-reinforced composite 202. As a result, the fibers 204 and thermoplastic resin material 118 may form a thermoplastic-based fiber-reinforced composite that encapsulates the preformed fiber-reinforced composite 202. Moreover, in embodiments in which the thermoset resin material of the preformed fiber-reinforced composite 202 is uncured prior to being directed through the pultrusion die 206, the thermoset resin material may be co-cured with the thermoplastic resin material 118 as the materials are passed through the die 206. The pultruded product 21 exiting the pultrusion die 206 may then be further processed, if desired, or rolled onto a spool for subsequent storage.

It should be appreciated that, using the above described system and method, the resulting pultruded product 212 may correspond to a hybrid-resin, fiber-reinforced plate having a thermoset-based fiber-reinforced composite surrounded by a thermoplastic-based fiber-reinforced composite. For example, as indicated by lines 5-5 in FIG. 7, the pultruded product 212 may have the same cross-section as that shown in FIG. 5. As such, the thermoplastic-based fiber-reinforced composite may form an exterior pultruded portion 106 of the pultruded product 212 while the thermoset-based fiber-reinforced composite may form an interior pultruded portion 104 of the pultruded product 212, the with exterior pultruded portion 106 generally encapsulating the interior pultruded portion 104.

It should also be appreciated that the thermoplastic materials described herein may welded together using any suitable welding device, means and/or method known in the art. For instance, suitable thermoplastic welding methods may include, but are not limited to, thermal welding, resistive welding, infrared welding, ultrasonic welding and/or chemical welding. Thermal welding may be achieved, for example, by heating the thermoplastic materials using a heat lamp, a laser light source, a heated flow of fluid and/or any other suitable heating device (e.g., a heat blanket or other conductive heating source).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
    a blade root;
    a blade tip;
    a body shell extending between the blade root and the blade tip; and
    a spar cap configured to provide structural support for the body shell, the spar cap being formed from an assembly of pre-formed pultruded products, each of the pultruded products comprising:
        an interior pultruded portion formed from a first fiber-reinforced composite including a first plurality of fibers impregnated with a thermoset resin material; and
        an exterior pultruded portion encapsulating the interior pultruded portion, the exterior pultruded portion being formed from a second fiber-reinforced composite including a second plurality of fibers impregnated with a thermoplastic resin material.

2. The rotor blade of claim 1, wherein the pultruded products are stacked one on top of the other such that the exterior pultruded portion of each pultruded product is positioned directly adjacent to the exterior pultruded portion of at least one adjacent pultruded product.

3. The rotor blade of claim 1, wherein the thermoplastic resin material contained within the exterior pultruded portion of each pultruded product is welded to the thermoplastic resin material contained within the exterior pultruded portion of an adjacent pultruded product to secure the adjacent pultruded products together.

4. The rotor blade of claim 1, wherein a volume of each pultruded product includes greater than 50% of the first fiber-reinforced composite and less than 50% of the second fiber-reinforced composite.

5. The rotor blade of claim 4, wherein the volume of each pultruded product includes greater than 75% of the first fiber-reinforced composite and less than 25% of the second fiber-reinforced composite.

6. The rotor blade of claim 1, wherein a thickness of the exterior pultruded portion is equal to at least one millimeter around an entire outer perimeter of the interior pultruded portion.

7. The rotor blade of claim 1, wherein each pultruded product corresponds to a pultruded plate defining a rectangular cross-sectional shape.

8. The rotor blade of claim 1, wherein fibers of the first plurality of fibers and the second plurality of fibers are continuous and extend along the same direction.

9. A rotor blade component for a wind turbine rotor blade, the rotor blade component comprising:
    an assembly of pre-formed pultruded products, each of the pultruded products comprising:
        an interior pultruded portion formed from a first fiber-reinforced composite including a first plurality of fibers impregnated with a thermoset resin material; and
        an exterior pultruded portion encapsulating the interior pultruded portion, the exterior pultruded portion being formed from a second fiber-reinforced composite including a second plurality of fibers impregnated with a thermoplastic resin material,
    wherein the thermoplastic resin material contained within the exterior pultruded portion of each pultruded product is welded to the thermoplastic resin material contained within the exterior pultruded portion of an adjacent pultruded product to secure the adjacent pultruded products together.

10. The rotor blade component of claim 9, wherein the pultruded products are stacked one on top of the other and welded together to form the blade component.

11. The rotor blade component of claim 9, wherein the volume of each pultruded product includes greater than 75% of the first fiber-reinforced composite and less than 25% of the second fiber-reinforced composite.

12. The rotor blade component of claim 9, wherein a thickness of the exterior pultruded portion is equal to at least one millimeter around an entire outer perimeter of the interior pultruded portion.

13. The rotor blade component of claim 9, wherein the rotor blade component corresponds to a spar cap of the wind turbine rotor blade.

14. A method for forming a pultruded hybrid-resin fiber-reinforced composite for use within a rotor blade component of a wind turbine rotor blade, the method comprising:
transporting a pre-formed fiber-reinforced composite along a travel path, the pre-formed fiber-reinforced composite including a first plurality of fibers impregnated with a thermoset resin material;
transporting a second plurality of fibers along the travel path, the second plurality of fibers being impregnated with a thermoplastic resin material; and
directing the pre-formed fiber-reinforced composite and the second plurality of fibers through a heated die such that a pultruded product is formed that includes an interior pultruded portion formed from the pre-formed fiber-reinforced composite and an exterior pultruded portion that encapsulates the interior pultruded portion, the exterior pultruded portion being formed from a second fiber-reinforced composite including the second plurality of fibers impregnated with the thermoplastic resin material.

15. The method of claim 14, wherein the thermoset resin material included within the pre-formed fiber-reinforced composite is cured prior to being directed through the heated die.

16. The method of claim 14, wherein the thermoset resin material included within the pre-formed fiber-reinforced composite is uncured prior to being directed through the heated die.

17. The method of claim 14, further comprising impregnating the second plurality of fibers with the thermoplastic resin material prior to directing the second plurality of fibers through the heated die.

18. The method of claim 15, wherein directing the pre-formed fiber-reinforced composite and the second plurality of fibers through the heated die comprises directing the second plurality of fibers through the heated die such that the second plurality of fibers surround the pre-formed fiber-reinforced composite.

19. The method of claim 14, wherein a volume of the pultruded product includes greater than 50% of the pre-formed fiber-reinforced composite and less than 50% of the second fiber-reinforced composite.

20. The method of claim 14, wherein the volume of the pultruded product includes greater than 75% of the pre-formed fiber-reinforced composite and less than 25% of the second fiber-reinforced composite.

21. The method of claim 14, wherein a thickness of the exterior pultruded portion is equal to at least one millimeter around an entire outer perimeter of the interior pultruded portion.

* * * * *